(No Model.)

H. W. & W. FULLER.
CALF WEANER.

No. 380,796.  Patented Apr. 10, 1888.

WITNESSES:
J. A. Clark
C. Sedgwick

INVENTOR:
H. W. Fuller
W. Fuller
BY Munn & Co.
ATTORNEYS.

UNITED STATES PATENT OFFICE.

HENRY W. FULLER AND WALTER FULLER, OF SENECA, KANSAS.

CALF-WEANER.

SPECIFICATION forming part of Letters Patent No. 380,796, dated April 10, 1888.

Application filed December 21, 1887. Serial No. 258,565. (No model.)

*To all whom it may concern:*

Be it known that we, HENRY W. FULLER and WALTER FULLER, of Seneca, in the county of Nemaha and State of Kansas, have invented a new and Improved Calf-Weaner, of which the following is a full, clear, and exact description.

This invention relates to an improvement in calf-weaners, and has for its object to provide a weaner which will be thoroughly effective.

The invention consists in a calf-weaner constructed and arranged as hereinafter described and claimed.

Reference is to be had to the accompanying drawings, forming a part of this specification, in which similar figures of reference indicate corresponding parts in both the views.

Figure 1:
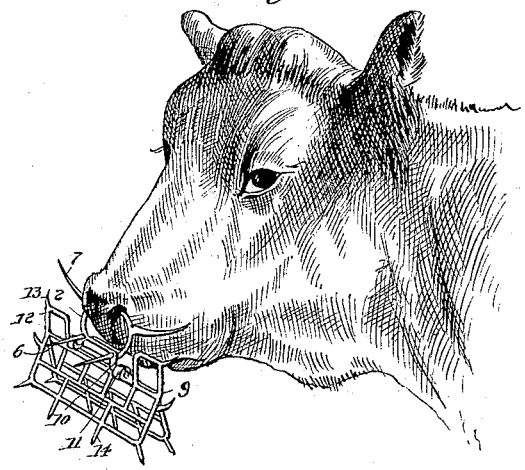
Figure 2:
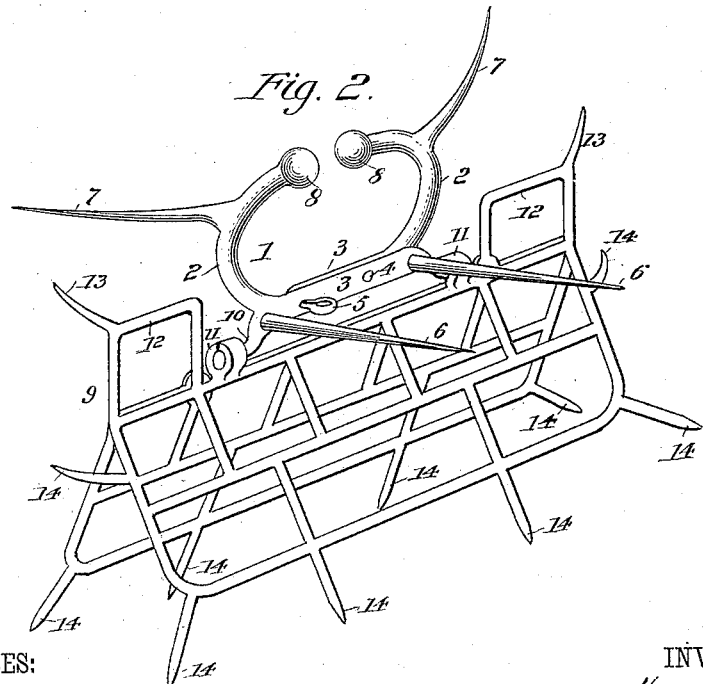

Figure 1 illustrates the invention as applied to an animal, and Fig. 2 is a perspective view of the weaner.

The weaner consists, essentially, of two parts, the nose-piece and a swinging frame or mouth-piece attached thereto.

The nose-piece 1 consists of two curved pieces, 2, having overlapping portions 3, pivoted together, as at 4, and fastened by means of a split pin, 5, projecting through perforations in the parts 3, or by any other suitable means. The nose-piece 1 is further formed with spikes 6, projecting forward from one of the parts 3, and with spikes 7, extending laterally from the curved pieces 2. The upper ends of the curved pieces 2 are formed with balls 8, adapted to press against the sides of the cartilage in the animal's nose.

The mouth-piece 9 consists of downwardly-diverging portions forming a V-shaped frame, preferably of lattice-work for the sake of lightness, and suspended from pivots 10 on one of the parts 3 of the nose-piece 1 by means of sockets 11, so as to swing freely. The nose-piece 1 and swinging frame 9 may be made of soft or malleable metal, or the nose-piece of hard metal and the swinging frame of wire, as preferred. The frame 9 may be made of solid plates, forming a V, as in the case shown, but the open-work frame is preferred as being lighter. The frame 9 is formed with extensions 12 and spikes 13, for a purpose hereinafter explained, and with a suitable number of spikes, 14, projecting from its sides and lower edges.

The use and operation of the weaner are as follows: The pin 5 being removed, the right-hand curved piece 2 is turned sidewise on the pivot 4. The knobbed ends 8 are inserted in the animal's nostrils and pressed closely against the cartilage of the nose, and held there by turning back the movable piece 2 and inserting the pin 5. The animal will not be prevented by the frame 9 from feeding, for as its head is lowered the frame will swing away from its mouth. If, however, it attempts to take hold of a teat, not only will the frame 9 be in the way, but the spikes 6 will also prick the cow, so that she will not allow the calf to approach the teat. It has been found, however, that in some cases the cow will, for the sake of the calf, stand the pricking of the spikes, and to furnish additional means to prevent that the frame 9 is formed V-shaped, so that if the spikes do not have the desired effect the frame, by reason of its shape, will keep the calf's mouth at a distance from the teat, one part lying over the calf's mouth and the other resting against the udder when the calf has raised its head to suck. The spikes 14 on the bottom edges and the sides also serve as guards and to prick the cow when the calf throws its head up sidewise in its efforts to get its mouth at the teat and past the mouth-frame. By means of the extensions 12 and spikes 13 the cow's teats cannot be worked between the frame 9 and the calf's head in the side movements of the calf to get its mouth at the teats.

The spikes 13 are employed instead of carrying up the extensions 12, as they answer the same purpose and do not counterbalance frame 9, as carrying up extensions 12 would be apt to do. The spikes 7 also serve to prevent the calf from getting at the teats by a side movement.

The several spikes described may be made integral with the frames, or separate, and secured thereto in any suitable way. While the frame 9 is shown as V-shaped, it is obvious that its construction may be modified so as to embrace a front and rear portion of different shape, forming a space between them to accomplish the same result.

Having thus fully described our invention, we claim as new and desire to secure by Letters Patent—

1. In a calf-weaner, the combination, with nose-piece 1, having pivoted arm 2, fastening-pin 5, and spikes 6 and 7, of V-shaped frame 9, pivoted to nose-piece 1, and having extensions 12, and spikes 13 and 14, substantially as described.

2. A calf-weaner consisting of a detachable nose-piece having side and front spikes, and a lattice-work frame with side and bottom and upwardly-projecting spikes, and formed in two portions projecting downward and diverging and pivoted to the nose-piece, substantially as described.

HENRY W. FULLER.
WALTER FULLER.

Witnesses:
CHARLES E. WILSON,
JOSEPH BEHNE.